(12) United States Patent
Liu et al.

(10) Patent No.: US 7,398,603 B2
(45) Date of Patent: Jul. 15, 2008

(54) DISTANCE MEASURING PROBE WITH AIR DISCHARGE SYSTEM

(75) Inventors: Qing Liu, Shenzhen (CN); Jun-Qi Li, Shenzhen (CN); Takeo Nakagawa, Tokyo (JP)

(73) Assignees: Hon Hai Precision Industry Co., Ltd., Tu-Cheng, Taipei Hsien (TW); FINE TECH Corporation, Tokyo (JP)

( * ) Notice: Subject to any disclaimer, the term of this patent is extended or adjusted under 35 U.S.C. 154(b) by 0 days.

(21) Appl. No.: 11/611,724

(22) Filed: Dec. 15, 2006

(65) Prior Publication Data

US 2007/0137058 A1    Jun. 21, 2007

(30) Foreign Application Priority Data

Dec. 21, 2005    (JP) .............................. 2005-367958

(51) Int. Cl.
  *G01B 5/012* (2006.01)
(52) U.S. Cl. ...................................... 33/559
(58) Field of Classification Search ............... 33/503, 33/556, 557, 558, 559, 560, 561
  See application file for complete search history.

(56) References Cited

U.S. PATENT DOCUMENTS

| | | | | | |
|---|---|---|---|---|---|
| 4,292,740 | A | * | 10/1981 | Vis et al. ....................... | 33/561 |
| 4,926,559 | A | * | 5/1990 | Knabel ........................ | 33/556 |
| 5,390,424 | A | * | 2/1995 | Butter et al. .................. | 33/561 |
| 5,404,650 | A | * | 4/1995 | Lindner ....................... | 33/559 |
| 5,414,940 | A | * | 5/1995 | Sturdevant ................... | 33/559 |
| 5,746,003 | A | * | 5/1998 | Baruchello .................... | 33/556 |
| 2004/0154178 | A1 | * | 8/2004 | Herkt et al. ................... | 33/559 |
| 2005/0229420 | A1 | * | 10/2005 | Brenner et al. ................ | 33/558 |

\* cited by examiner

*Primary Examiner*—G. Bradley Bennett

(57) ABSTRACT

An exemplary distance measuring probe (100) includes a tube track (12), a tip extension (16), a pair of hollow tubes (14), a pair of air discharge systems (115), a linear measuring scale (18), and a displacement sensor (19). The tip extension is configured to touch a surface of an object (50). The linear measuring scale and the displacement sensor are respectively fixed relative to one of the tube track and the tip extension. The hollow tubes contain a flux of air, and are configured to cooperatively push the tip extension to move. Each air discharge system ejects part of air in the corresponding hollow tube out of the hollow tube. The linear measuring scale displays values of displacements of the tip extension. The displacement sensor detects and reads the displacement values displayed by the linear measuring scale.

19 Claims, 16 Drawing Sheets

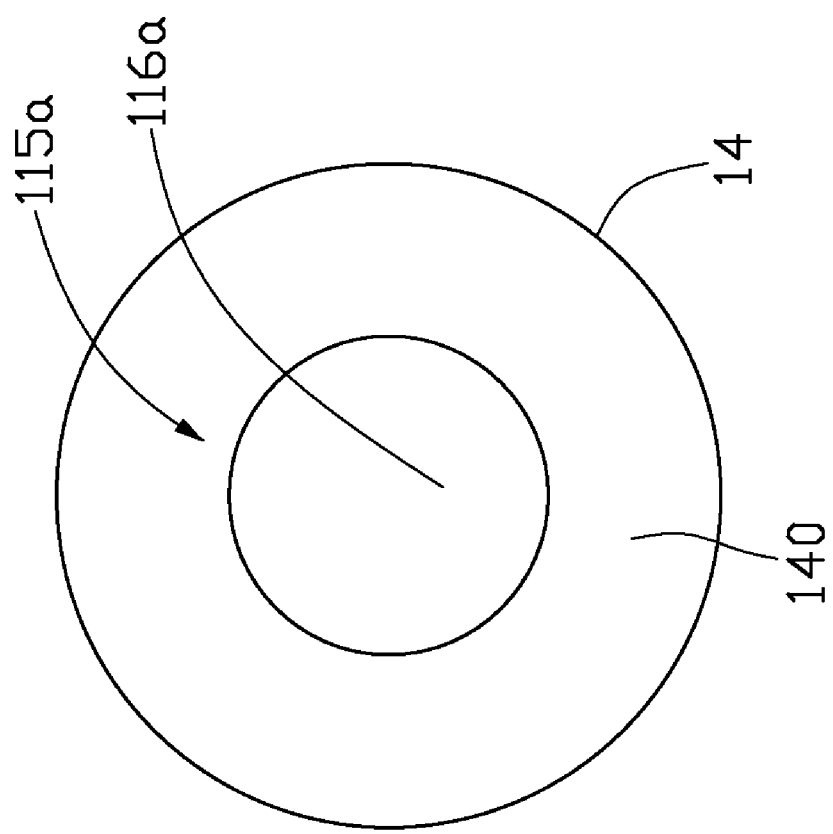

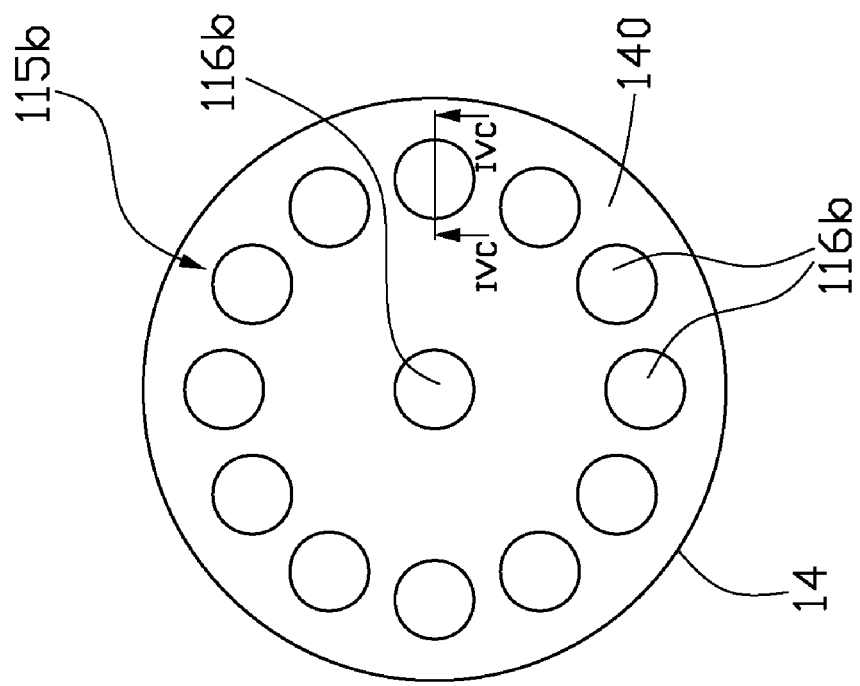

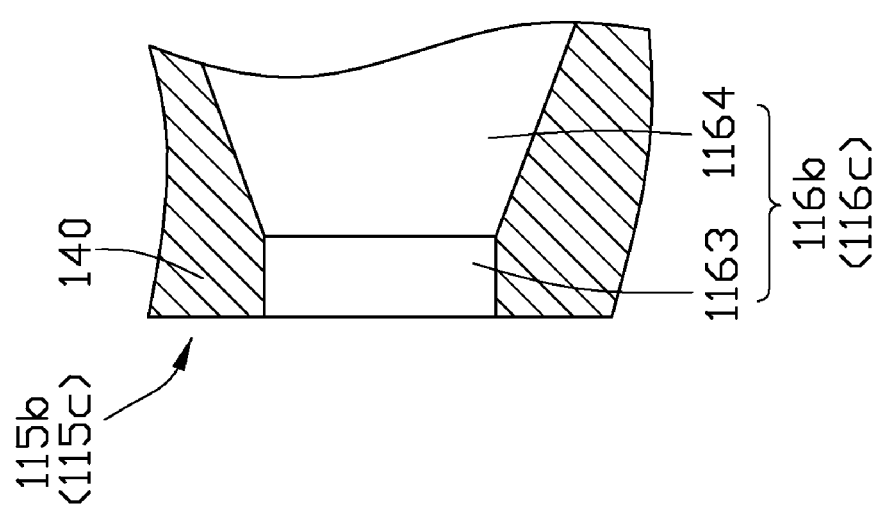

DISTANCE MEASURING PROBE WITH AIR DISCHARGE SYSTEM

BACKGROUND OF THE INVENTION

1. Field of the Invention

The present invention relates generally to distance measuring probes for coordinate measuring machines (CMMs) and actuators used in distance measuring probes; and more particularly to a distance measuring probe with an air discharge system using a relatively small, steady measuring force for contact-type distance measuring devices and an actuator providing a relatively small, steady measuring force.

2. Discussion of the Related Art

Manufactured precision objects such as optical components (for example, aspherical lenses) and various industrial components need to be measured to determine whether manufacturing errors of the objects are within acceptable tolerance ranges. Such manufacturing errors are differences between design dimensions of the object and actual dimensions of the manufactured object. Measured dimensions of the manufactured object are usually regarded as the actual dimensions. A precision measuring device is used to measure the objects; and the more precise the measuring device, the better. Generally, the precision objects are measured with a coordinate measuring machine (CMM), which has a touch trigger probe that contacts the objects. A measuring force applied to the touch trigger probe of the coordinate measuring machine should be small and steady. If the measuring force is too great, a measuring contact tip of the touch trigger probe is easily damaged and causes a measuring error. If the measuring force is not steady, a relatively large measuring error occurs.

As indicated above, a contact-type coordinate measuring device is commonly used to measure dimensions of precision objects such as optical components and certain industrial components. A measuring force is provided to the touch trigger probe by the coordinate measuring device. However, if the object has a slanted surface, the contact tip of the touch trigger probe may become bent or deformed by a counterforce acting on the touch trigger probe, thereby causing a measuring error. Therefore, the touch trigger probe is not ideal for measuring precision lenses having slanted surfaces.

Nowadays, two methods are generally used to reduce a measuring force on the touch trigger probe. In a first method, the contact tip is slantingly arranged so that a component force of gravity acting on the measuring contact tip is regarded as a measuring force. The contact tip is very light, so the measuring force is very small accordingly. However, if a slanted angle of the contact tip changes during measuring, the measuring force changes, which makes the measuring force difficult to control. In a second method, the touch trigger probe is configured with a spring. An elastic force of the spring is regarded as a measuring force. However, when the contact tip moves upward and downward along the surface of the object being measured, a vibration of the upward and downward movement may cause the spring to resonate and deform. Therefore, the measuring force varies with the deformation of the spring. Thus both methods are subject to errors occurring in the measurement results.

In another kind of probe, a measuring force is provided by an air pump. However, the air pump provides pulsed pressure. Therefore, the air pump cannot provide a small, steady measuring force.

Therefore, a distance measuring probe employing a relatively small, steady measuring force is desired.

SUMMARY

In one aspect, a distance measuring probe includes at least one tube track, a tip extension, at least one hollow tube, an air discharge system, a linear measuring scale, and a displacement sensor. The tip extension is linearly movable relative to the at least one tube track for touching a surface of an object. The at least one hollow tube is partly received in the at least one tube track and linearly slidable in the at least one tube track. Each of the at least one hollow tube defines a cavity for containing a flux of air, and is configured to be driven by the flux of air to push the tip extension to move. The air discharge system is configured to eject at least part of the flux of air in the at least one hollow tube out of the at least one hollow tube. The linear measuring scale is configured to display values of displacements of the tip extension, and is fixed relative to one of the at least one tube track and the tip extension. The displacement sensor is configured to detect and read the displacement values of the tip extension displayed by the linear measuring scale, and is fixed relative to the other one of the at least one tube track and the tip extension.

In another aspect, an actuator is provided to drive a tip extension of a distance measuring probe. The actuator includes at least one hollow tube and at least one air discharge system. Each of the at least one hollow tube defines a cavity for containing a flux of air, and is configured to be driven by the flux of air to drive the tip extension to move. The air discharge system is configured to allow at least part of the flux of air in the cavity of the at least one hollow tube be ejected out of the at least one hollow tube.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the distance measuring probe. Moreover, in the drawings, like reference numerals designate corresponding parts throughout the several views.

FIG. 3A is an enlarged, front view of an air discharge system of the distance measuring probe of FIG. 1, showing a first embodiment of the air discharge system.

FIG. 4A is an enlarged, front view of a second embodiment of an air discharge system that can be employed in the distance measuring probe of the first embodiment.

FIG. 4C is a cross-sectional view taken along line IVC-IVC of FIG. 4A and likewise taken along line IVC-IVC of FIG. 4B.

DETAILED DESCRIPTION OF THE EMBODIMENTS

Figure 1:
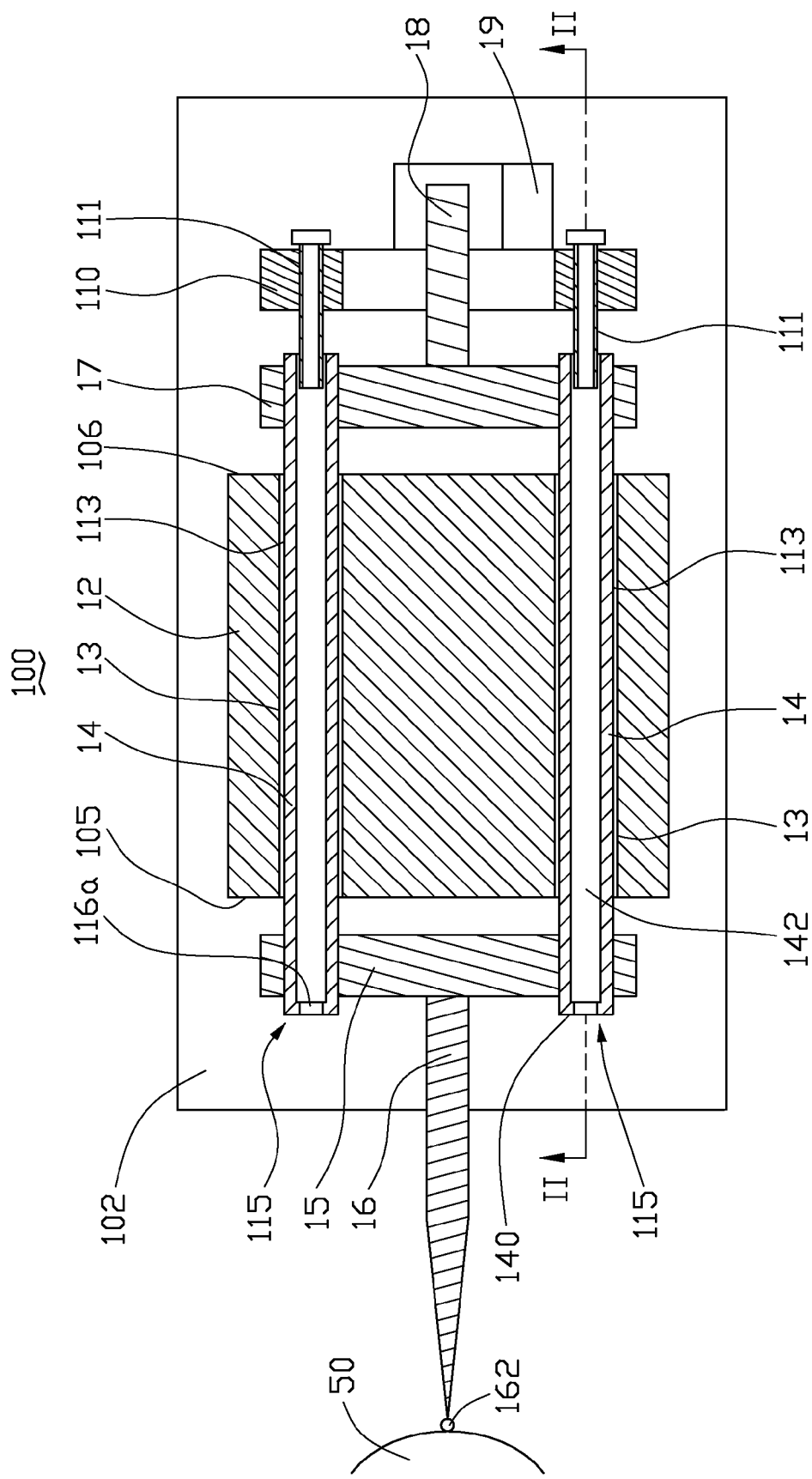
FIG. 1 is a top plan, cross-sectional view of a distance measuring probe in accordance with a first embodiment of the present invention, the distance measuring probe including a pair of hollow tubes and a pair of pipes.
Figure 2:
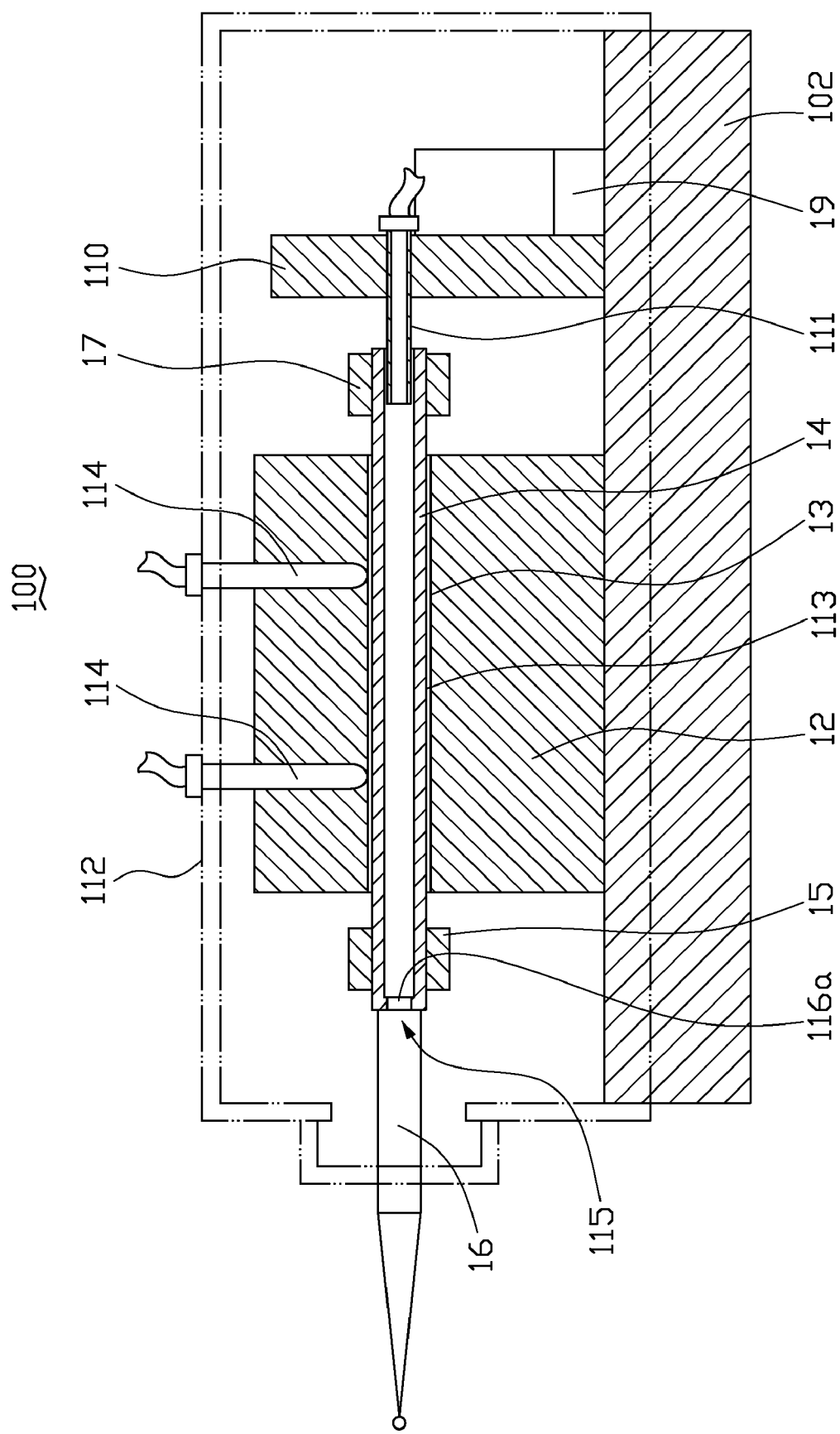
FIG. 2 is a cross-sectional view of the distance measuring probe of FIG. 1, corresponding to line II-II thereof.

Referring to FIG. 1 and FIG. 2, these show a distance measuring probe 100 of a first embodiment of the present invention. The distance measuring probe 100 includes a base 102, a tube track 12, two hollow tubes 14, a first tube frame 15, a tip extension 16, a second tube frame 17, a linear measuring scale 18, a displacement sensor 19, a pipe holder 110, and two pipes 111. In alternative embodiments, the distance measuring probe 100 can include only one hollow tube 14 or more than two hollow tubes 14. In such cases, there can correspondingly be only one pipe 111 or more than two pipes 111. The hollow tubes 14 and the first and second frames 15, 17 collectively form a movable rack (not labeled).

The base 102 is substantially a flat rectangular plate. It should be understood that the base 102 may alternatively have any other suitable shape. The tube track 12 is mounted securely onto the base 102. The tube track 12 has a front end 105 and a rear end 106. The tube track 12 defines two tube rail channels 13 each extending from the front end 105 to the rear end 106. The tube rail channels 13 are spaced apart from and aligned parallel to each other. In alternative embodiments, the tube track 12 may define only one tube rail channel 13 or more than two tube rail channels 13, corresponding to the number of hollow tubes 14.

Each of the hollow tubes 14 is a cylinder defining a cavity 142 that extends through the hollow tube 14 from a rear open end of the hollow tube 14 to a front cylinder base 140 of the hollow tube 14. Each of the hollow tubes 14 is received through the corresponding tube rail channel 13 of the tube track 12. The open ends of the hollow tubes 14 protrude out from the rear end 106 and are fixed onto the second tube frame 17. The cylinder bases 140 of the hollow tubes 14 protrude out from the front end 105 and are fixed onto the first tube frame 15. An outer diameter of the hollow tubes 14 is configured to be smaller than a diameter of the tube rail channels 13, so that a gap (not labeled) is defined between each hollow tube 14 and the tube track 12. Air is pumped into the gap between the hollow tubes 14 and the tube track 12. Thus, an air bearing 113 is formed between each of the hollow tubes 14 and the tube track 12 when the gaps are filled with air. The hollow tubes 14 are made of one of stainless steel, aluminum (Al), titanium (Ti), and carbon steel.

Each of the pipes 111 is partially inserted into the open end of a corresponding hollow tube 14. Also referring to FIG. 6A, an outer diameter of the pipes 111 is smaller than a diameter of the cavities 142 of the hollow tubes 14, so that a gap 118 is defined between each pipe 111 and the corresponding hollow tube 14. An air bearing (not labeled) is formed between each pipe 111 and the corresponding hollow tube 14 when air is pumped into the cavities 142 of the hollow tubes 14 via the pipes 111. Therefore, frictional forces between the hollow tubes 14 and the tube track 12, and between the pipes 111 and the hollow tubes 14, are significantly small. The result is that the hollow tubes 14 can move in the tube rail channels 13 smoothly. It should be understood that the gap 118 may be omitted. Alternatively, lubricant can be provided between the pipes 111 and the hollow tubes 14 to reduce frictional forces.

The pipe holder 110 is fixed on the base 102 behind the second tube frame 17. The pipe holder 110 is configured to hold the pipes 111 in position. When air is pumped into the cavities 142 of the hollow tubes 14, an air current inside the cavities 142 creates a pushing force that pushes the hollow tube 14 away from the pipes 111, thereby driving the tip extension 16 away from the second tube frame 17. The air pumped into the cavities 142 of the hollow tubes 14 and the tube rail channels 13 may be replaced by any other suitable kind of gas such as oxygen, nitrogen, etc.

The tip extension 16 is needle-shaped, and has a contact tip 162 that touches an object 50 when the distance measuring probe 100 is used for measuring the object 50. The tip extension 16 is fixed on the first tube frame 15 so that the tip extension 16 is linearly movable together with the movable rack. The linear measuring scale 18 is fixed on the second tube frame 17 such that it moves (displaces) linearly when the movable rack moves. The displacement sensor 19 is mounted on the base 102 corresponding to the linear measuring scale 18. The displacement sensor 19 is used for reading displacement values of the linear measuring scale 18. Alternatively, the positions of the linear measuring scale 18 and the displacement sensor 19 may be exchanged.

Referring to FIG. 2, the distance measuring probe 100 further includes a cover 112 that engages on the base 102 and completely seals the various other components of the distance measuring probe 100. The cover 112 defines an opening (not labeled) for allowing a part of the tip extension 16 to extend out therefrom. Air is pumped into the gaps between the tube track 12 and the hollow tubes 14 to form the air bearing 113 via a plurality of tubes 114 mounted to the cover 112.

The following describes a plurality of exemplary embodiments of an air discharge system 115 of the distance measuring probe 100. The air discharge system 115 is configured to eject air out of the cavity 142 of each hollow tube 14.

Figure 3B:
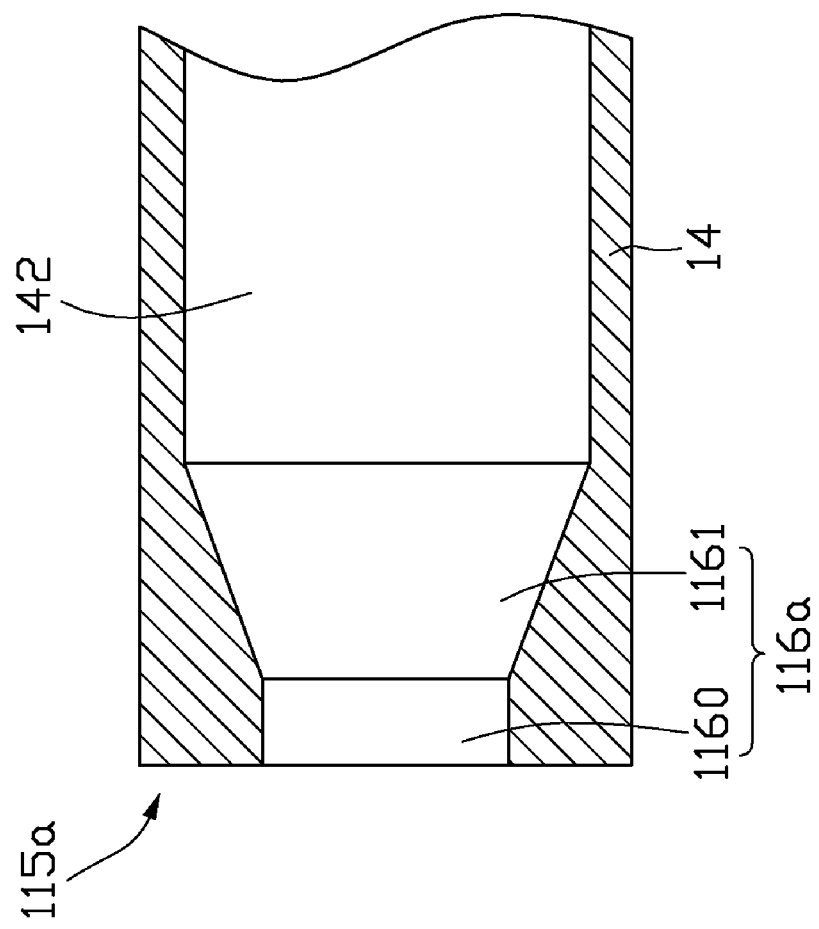
FIG. 3B is an enlarged, longitudinal cross-sectional view of a front end portion of one of the hollow tubes of FIG. 1, showing the first embodiment of the air discharge system thereof.

Referring to FIG. 1, FIG. 3A, and FIG. 3B, a first embodiment of an air discharge system 115a includes an air eject hole 116a defined in a center of the cylinder base 140 of each hollow tube 14. The air eject hole 116a includes a front cylindrical portion 1160 and a frustum portion 1161. The frustum portion 1161 intercommunicates the front cylindrical portion 1160 and the cavity 142. A diameter of the front cylindrical portion 1160 is equal to a smallest diameter of the frustum portion 1161. The frustum portion 1161 defines a conical frustum shape, with a radius of the conical frustum gradually decreasing from the cavity 142 to the front cylindrical portion 1160. Thereby, air can flow smoothly out of the hollow tube 14 through the air eject hole 116a of the air discharge system 115a.

Referring to FIG. 4A and FIG. 4C, a second embodiment of an air discharge system 115b includes a central air eject hole 116b defined in the cylinder base 140 of each hollow tube 14, and a plurality of peripheral air eject holes 116b defined in the cylinder base 140 and surrounding the central air eject hole 116b. Each air eject hole 116b defines a front cylindrical portion 1163 and a frustum portion 1164. The frustum portion 1164 intercommunicates the front cylindrical portion 1163 and the cavity 142. A diameter of the front cylindrical portion 1163 is equal to a smallest diameter of the frustum portion 1164. The frustum portion 1164 defines a conical frustum shape, with a radius of the conical frustum gradually decreasing from the cavity 142 to the front cylindrical portion 1163. Thereby, air can flow smoothly out of the hollow tube 14 through the air eject holes 116b of the air discharge system 115b.

Figure 4B:
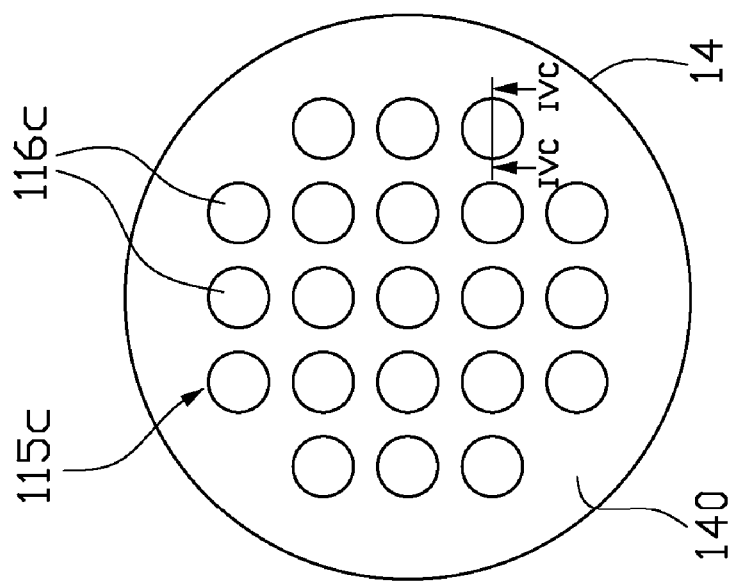
FIG. 4B is an enlarged, front view of a third embodiment an air discharge system that can be employed in the distance measuring probe of the first embodiment.

Referring to FIG. 4B and FIG. 4C, a third embodiment of an air discharge system 115c includes a plurality of air eject holes 116c defined in the cylinder base 140 of each hollow tube 14. The air eject holes 116c are distributed in a regular array. The air eject holes 116c may each be configured the same as the air eject holes 116b. Alternatively, the air eject holes 116a, 116b, and 116c may also be configured with cylindrical shaped.

Figure 5A:
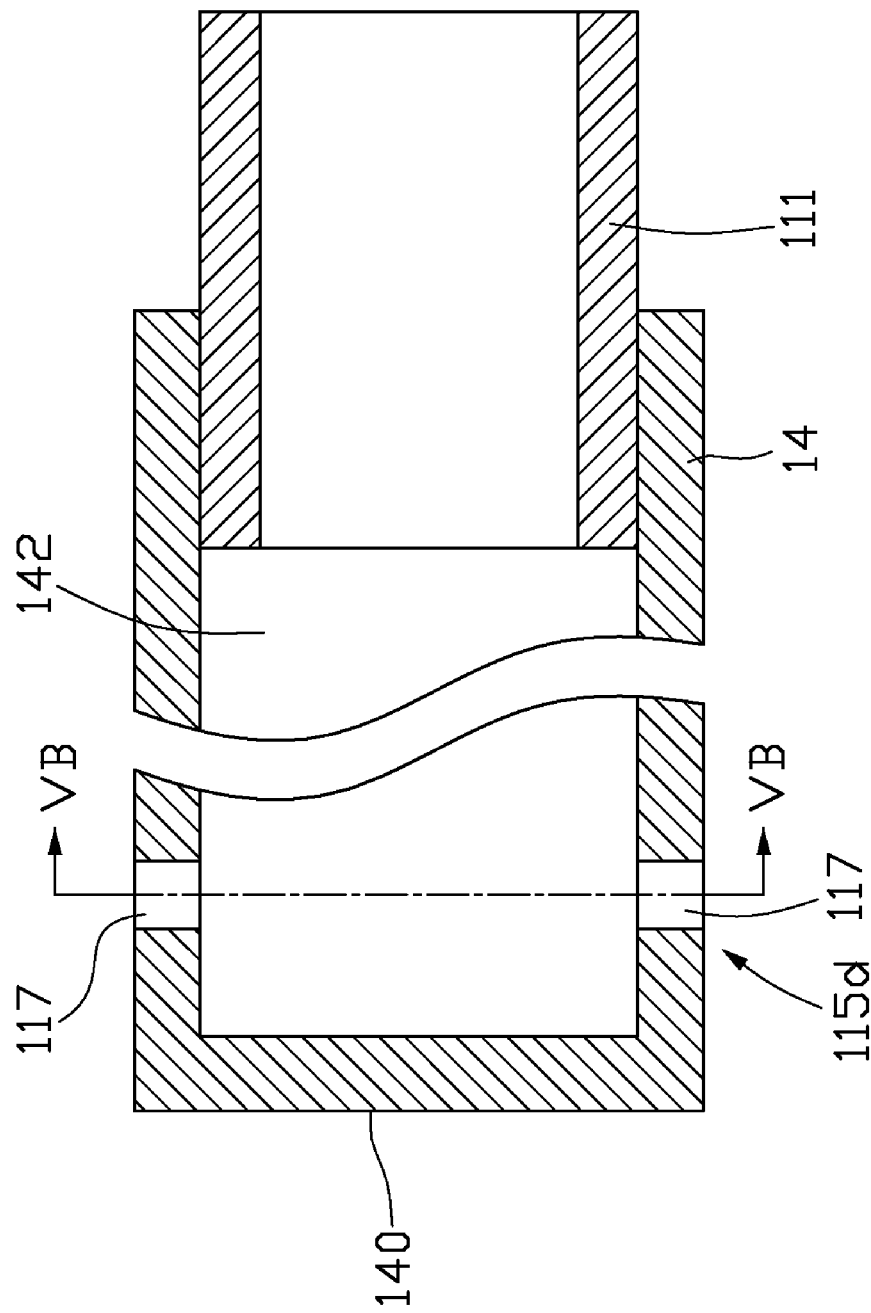
FIG. 5A is an enlarged, abbreviated view corresponding to one of the hollow tubes and part of a corresponding one of the pipes of FIG. 1, showing part of a fourth embodiment of an air discharge system that can be employed in the distance measuring probe of the first embodiment.
Figure 5B:
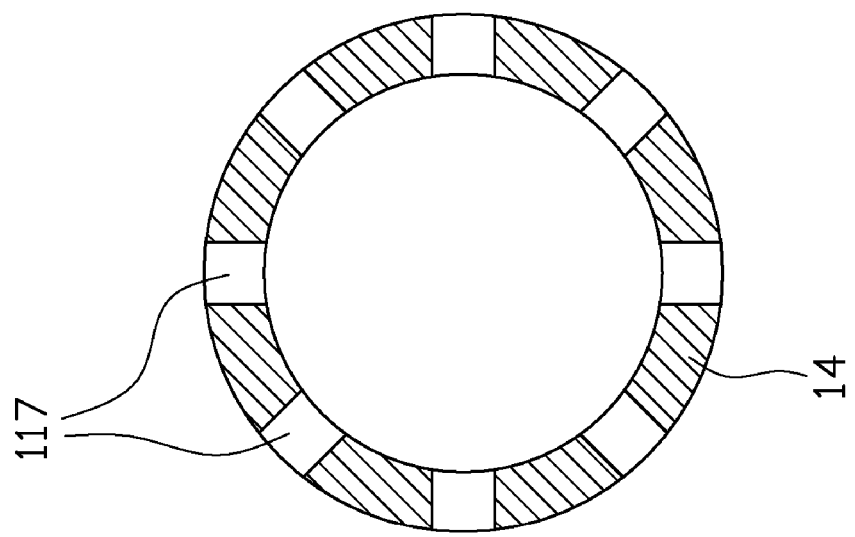
FIG. 5B is a cross-sectional view corresponding to line VB-VB of FIG. 5A.

Referring to FIG. 5A and FIG. 5B, a fourth embodiment of an air discharge system 115d includes a plurality of cylindrical air eject holes 117 defined in a sidewall of each hollow tube 14. In particular, the air eject holes 117 may be defined adjacent to the cylinder base 140 of the hollow tube 14, in positions where the air eject holes 117 are exposed outside of the first tube frame 15 and always exposed outside of the front end 105 of the tube track 12. The air eject holes 117 can be arranged in a ring and evenly spaced apart. Each of the air eject holes 117 is cylindrical. Alternatively, each of the air eject holes 117 may be configured to have the same shape as the air eject holes 116b, 116c. The distance measuring probe 100 with the air discharge system 115d can tolerate harsh environments, because the cylinder bases 140 of the hollow tubes 14 are completely closed.

Figure 6A:
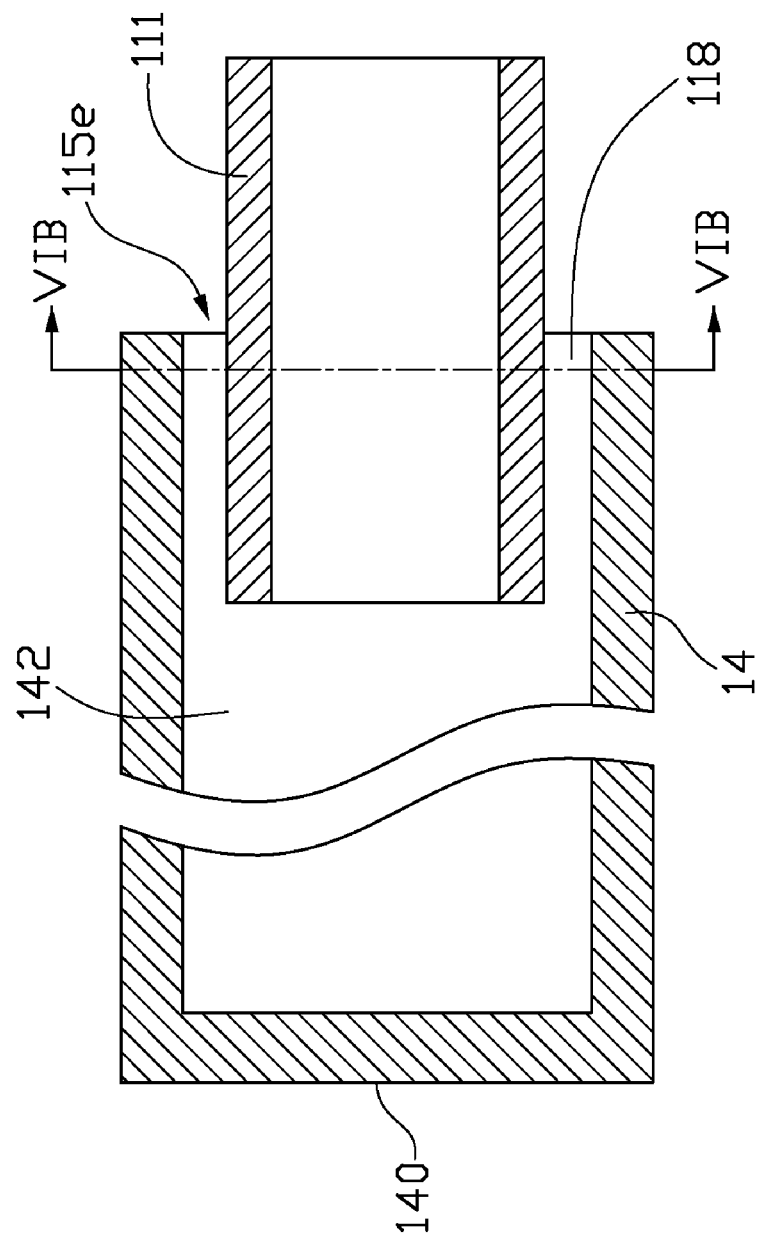
FIG. 6A is an enlarged, abbreviated view corresponding to one of the hollow tubes and part of a corresponding one of the pipes of FIG. 1, showing a fifth embodiment an air discharge system that can be employed in the distance measuring probe of the first embodiment.
Figure 6B:
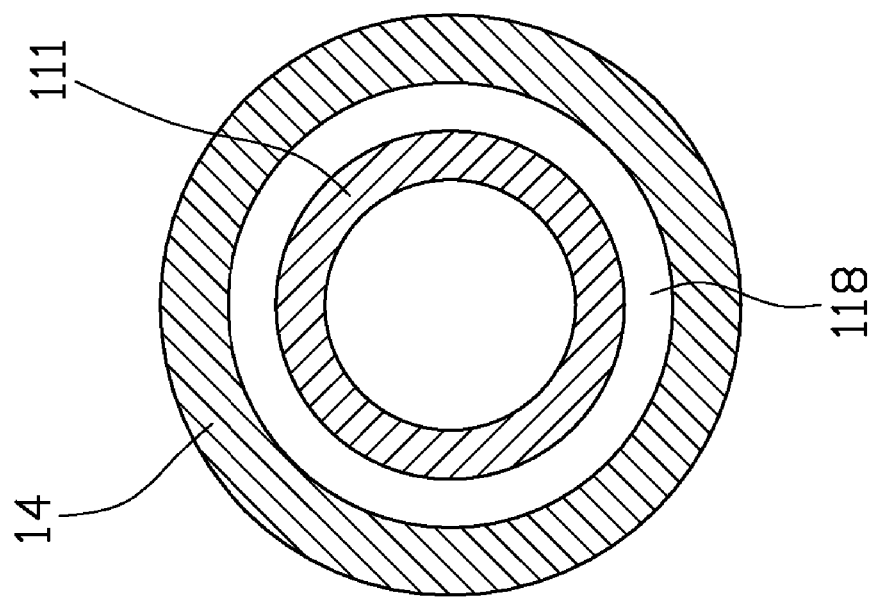
FIG. 6B is a cross-sectional view corresponding to line VIB-VIB of FIG. 6A.

Referring to FIG. 6A and FIG. 6B, a fifth embodiment of an air discharge system 115e is constituted by the gap 118 between each hollow tube 14 and the corresponding pipe 111. Similar to the distance measuring probe 100 with the air discharge system 115d of the fourth embodiment, the distance measuring probe 100 with the air discharge system 115e can also tolerate harsh environments. Further, the air discharge system 115 of each hollow tube 14 may be selected from any one or more of the above-described first through fifth embodiments. That is, the air discharge system 115 may be selected from any of the group consisting of the air eject hole 116a of the first embodiment, the air eject holes 116b of the second embodiment, the air eject holes 116c of the third embodiment, the air eject holes 117 of the fourth embodiment, and the gap 118 of the fifth embodiment.

In use, the distance measuring probe 100 is placed near the object 50. The pipes 111 and the tubes 114 communicate with an air chamber (not shown), and air is pumped into the cavities 142 of the hollow tubes 14 and the gaps between the tube track 12 and the hollow tubes 14. When the contact tip 162 of the tip extension 16 touches the object 50, the movable rack together with the tip extension 16 stops moving. When the tip extension 16 and correspondingly the linear measuring scale 18 move from one position to another position, the displacement sensor 19 detects and reads a displacement of the linear measuring scale 18. That is, a displacement of the tip extension 16 is measured.

When air is pumped into the cavities 142 of the hollow tubes 14, air pressure in the cavities 142 pushes air out of the hollow tubes 14 via the air discharge systems 115. That is, air is continuously pumped into the hollow tubes 14 via the pipes 111 and continuously ejected out of the hollow tubes 14 via the air discharge systems 115. Part of air pumped into the hollow tubes 14 strikes the cylinder bases 140 of the hollow tubes 14. Thus, air pressure pushes the hollow tubes 14 to move. The air pressure pushing the hollow tubes 14 is relatively small and steady because air is continuously ejected out of the hollow tubes 14. That is, an overall measuring force that pushes the tip extension 16 is relatively small and steady. As a result, the tip extension 16 of the distance measuring probe 100 is pushed so that the contact tip 162 gently touches the object 50. Thus, the contact tip 162 of the tip extension 16 and the object 50 are not easily deformed or damaged, and a precision of measurement is very high. Assuming that an area of an inside end surface of the cylinder base 140 of each hollow tube 14 is constant, then a value of a measuring force pushing the tip extension 16 is determined by an area of the air eject hole 116a, the air eject holes 116b, the air eject holes 116c, the air eject holes 117 or the gap 118 of each hollow tube 14. For example, in general, the measuring force decreases as the area of the air eject hole 116a, the air eject holes 116b, the air eject holes 116c, the air eject holes 117 or the gap 118 increases. In addition, a pressure inside the cover 112 is kept higher than that of the environment outside the cover 112, because air ejected out of the air bearings 113 and the hollow tubes 14 fills the cover 112. Thus, dust and other particles are prevented from entering the cover 112 through any openings thereof.

Figure 7:
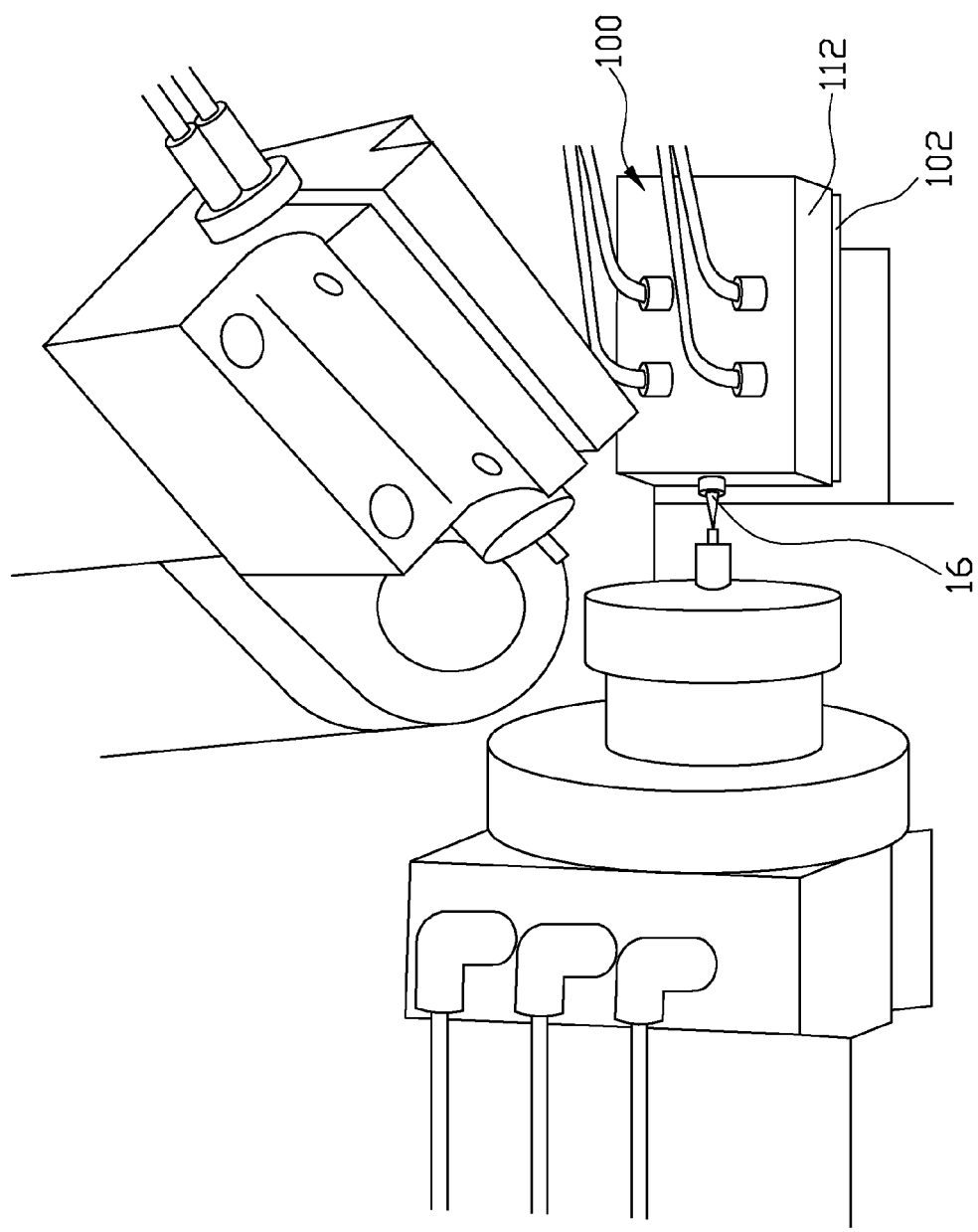
FIG. 7 is an isometric view of an exemplary application of the distance measuring probe of FIG. 1.

In manufacturing precision components such as optical lenses, the optical lenses generally need to be machined again if they do not fall within specified tolerances of shape and dimension. Referring to FIG. 7, the distance measuring probe 100 is applied in very high precision equipment for manufacturing optical lenses. The optical lenses are measured on the one piece of equipment immediately after being machined. Therefore, there is no error caused by releasing the optical lenses from machining equipment and reclamping the optical lenses on a measuring machine. Further, much time can be saved. Generally, the manufacturing time can be reduced by as much as ⅕ or even ⅓. The very high precision equipment includes a master actuator that moves the distance measuring probe 100 in at least one direction. That is, the master actuator can be a one-axis actuator, a two-axis actuator, a three-axis actuator, or can be another kind of driving master actuator.

The distance measuring probe 100 is connected to a processor (not shown). The master actuator of the very high precision equipment, the distance measuring probe 100, and the processor cooperatively form a coordinate measuring machine. Supposing that a surface of the object 50 (e.g., an optical lens) is manufactured according to predetermined 3D (three-dimensional) coordinate surface values. When the tip extension 16 touches the object 50, the displacement sensor 19 sends values of the displacements of the tip extension 16 and the movable rack read from the linear measuring scale 18 to the processor. The processor records and manages the values. For example, the processor obtains a distance from one measured point on the surface of the object 50 to a reference point (for example, a z-coordinate distance as a function of x-y coordinates). The distance is then applied to obtain a corresponding point in space of the surface of the object 50. The point in space is then analyzed and compared with a set of predetermined 3D surface values, in order to calculate manufacturing error values of the object 50.

Figure 8:
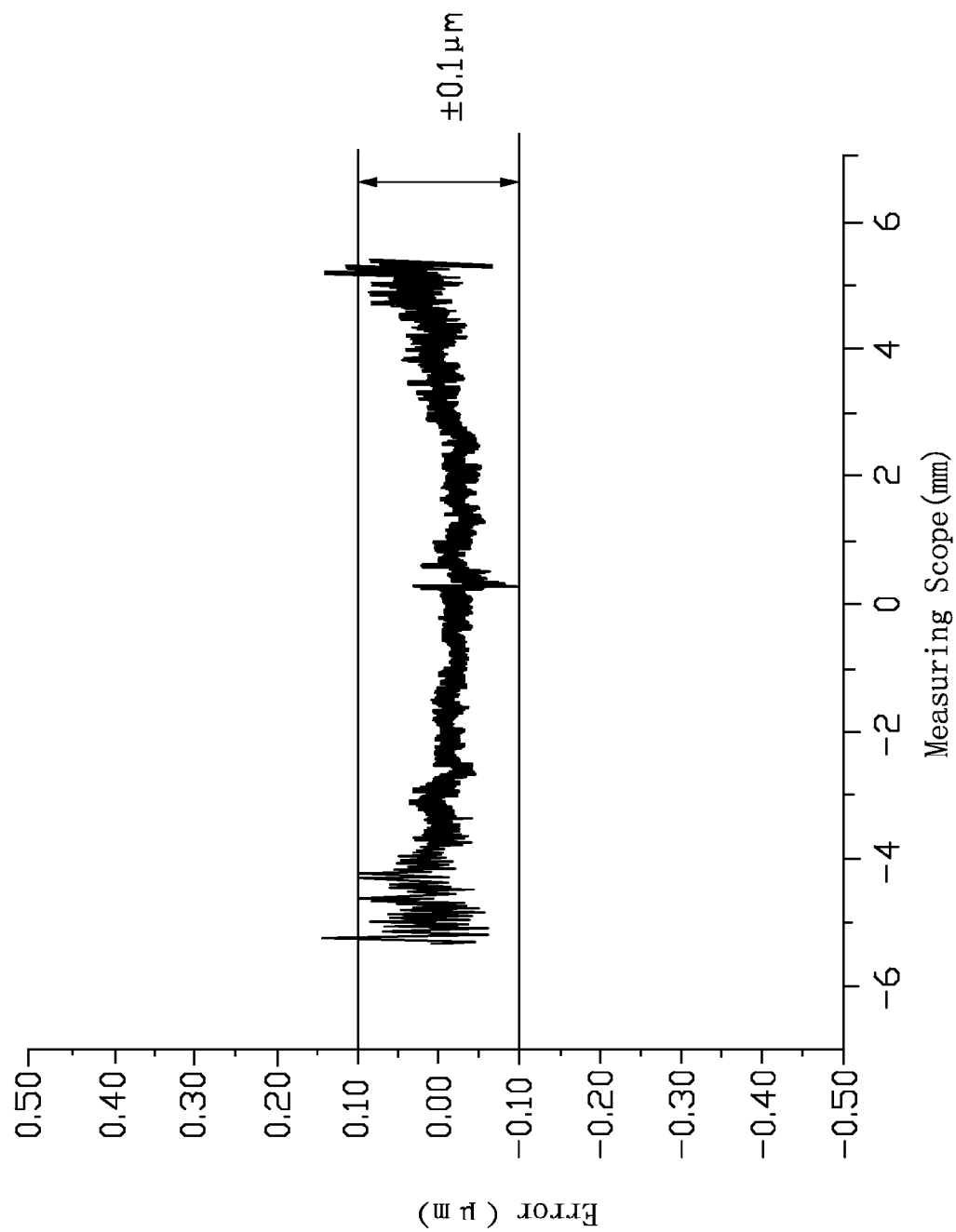
FIG. 8 is a graph showing manufacturing error data obtained by the distance measuring probe of FIG. 1 measuring a gauge-grade sphere having a radius of 5.5573 mm.
Figure 9:
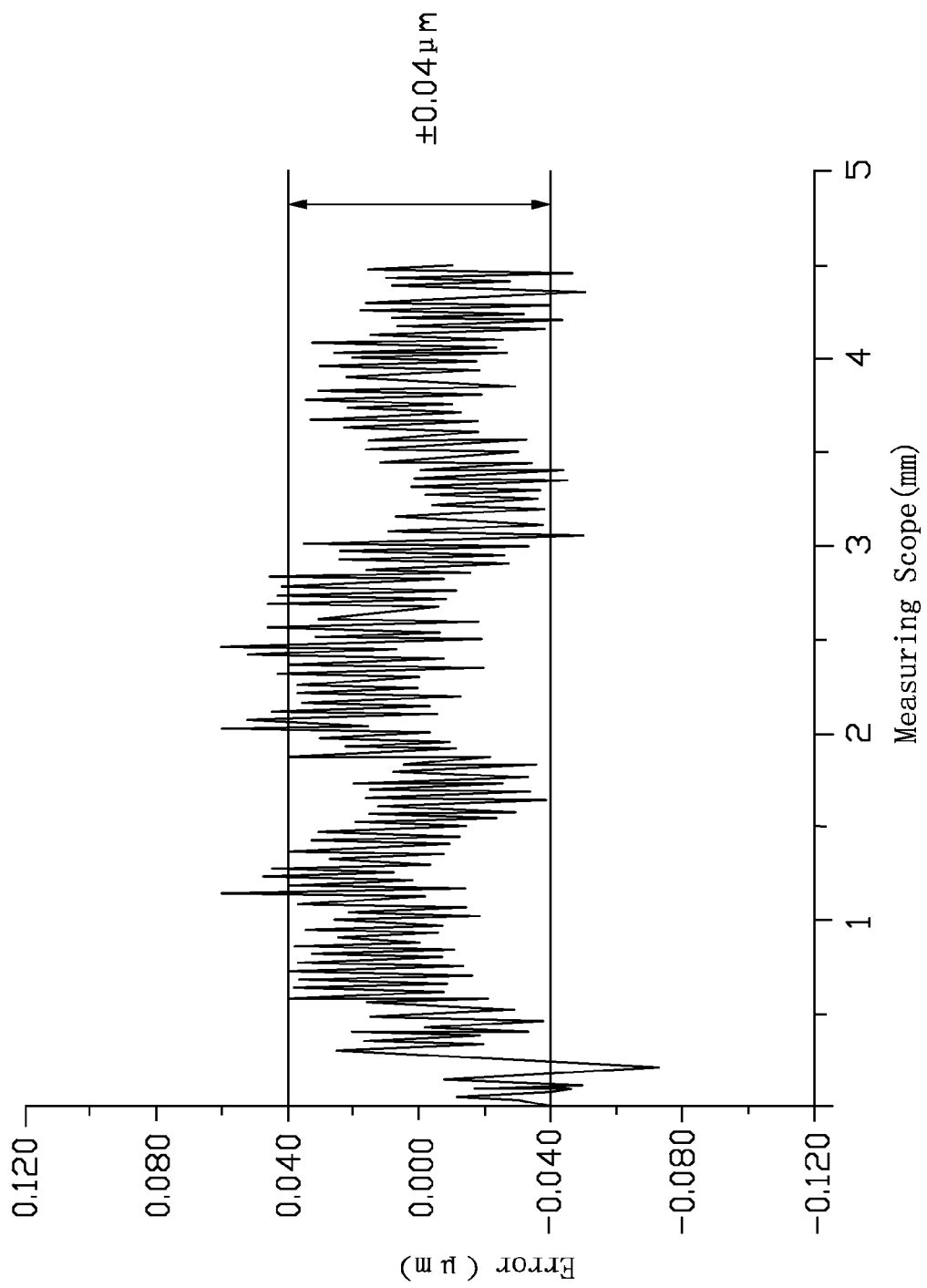
FIG. 9 is a graph showing manufacturing error data obtained by the distance measuring probe of FIG. 1 measuring a normal sphere (e.g. a ball bearing) having a radius of approximately 10.0 mm.

FIG. 8 is a graph showing manufacturing error data obtained by the distance measuring probe 100 measuring a gauge-grade sphere having a radius of 5.5573 mm. The error data shown are obtained by measuring a series of points of a surface of the gauge-grade sphere with a coordinate value in a one-directional axis across a range of about 11 millimeters. It can be seen that most of the manufacturing errors are in the range of ±0.1 microns (μm). FIG. 9 is a graph showing manufacturing error data obtained by the distance measuring probe 100 measuring a normal sphere (e.g. a ball bearing) having a radius of approximately 10.0 mm. The error data shown are obtained by measuring a series of points of a surface of the normal sphere with a coordinate value in a one-directional axis across a range of about 4.5 millimeters. It can be seen that most of the manufacturing errors are in the range of ±0.04 microns (μm). In each case, the distance measuring probe 100 provides highly accurate manufacturing error data.

Figure 10:
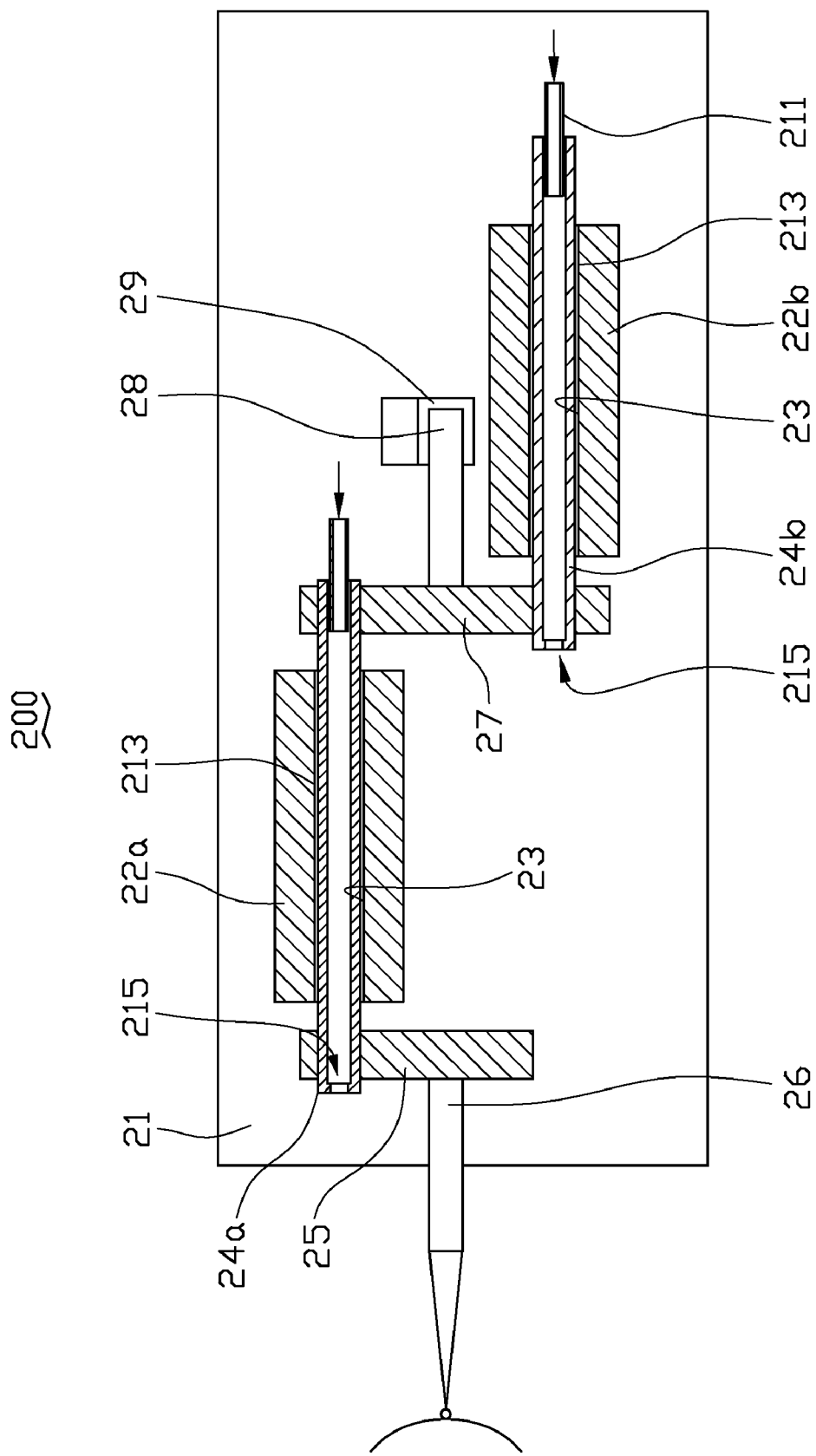
FIG. 10 is a top plan, cross-sectional view of a distance measuring probe in accordance with a second embodiment of the present invention.

Referring to FIG. 10, a distance measuring probe 200 of a second embodiment of the present invention includes a base 21, two tube tracks 22a, 22b, two hollow tubes 24a, 24b, a first tube frame 25, a tip extension 26, a second tube frame 27, a linear measuring scale 28, a displacement sensor 29, and two pipes 211. In alternative embodiments, the distance measuring probe 200 can include more than two hollow tubes 24a, 24b. In such cases, there can be more than two pipes 211.

The tube tracks 22a, 22b are mounted securely on the base 21. The tube tracks 22a, 22b are spaced apart from and parallel to each other. Each tube track 22a, 22b defines a tube rail channel 23 for receiving the corresponding hollow tube 24a, 24b. An air bearing is formed between the hollow tube 24a and the tube track 22a, and an air bearing 213 is formed between the hollow tube 24b and the tube track 22b. The distance measuring probe 200 is similar in principle to the distance measuring probe 100 of the first embodiment, except that the tube tracks 22a, 22b are offset from each other. That is, the tube track 22a is set at a front portion of the base 21, and the tube track 22b is set at a back portion of the base 21. The distance measuring probe 200 includes a pair of air discharge systems 215, which are substantially the same as the air discharge systems 115 of the distance measuring probe 100. Because the tube tracks 22a, 22b are offset from each other, the tube tracks 22a, 22b in combination hold the hollow tubes 24a, 24b along a greater length as measured along a direction coinciding with an axis of movement of the tip extension 26, compared with a corresponding length along which the tube track 12 holds the tip extension 16 in the distance measuring probe 100. Thereby, the tip extension 26 can move very steadily forward and backward with little or no lateral displacement.

Figure 11:
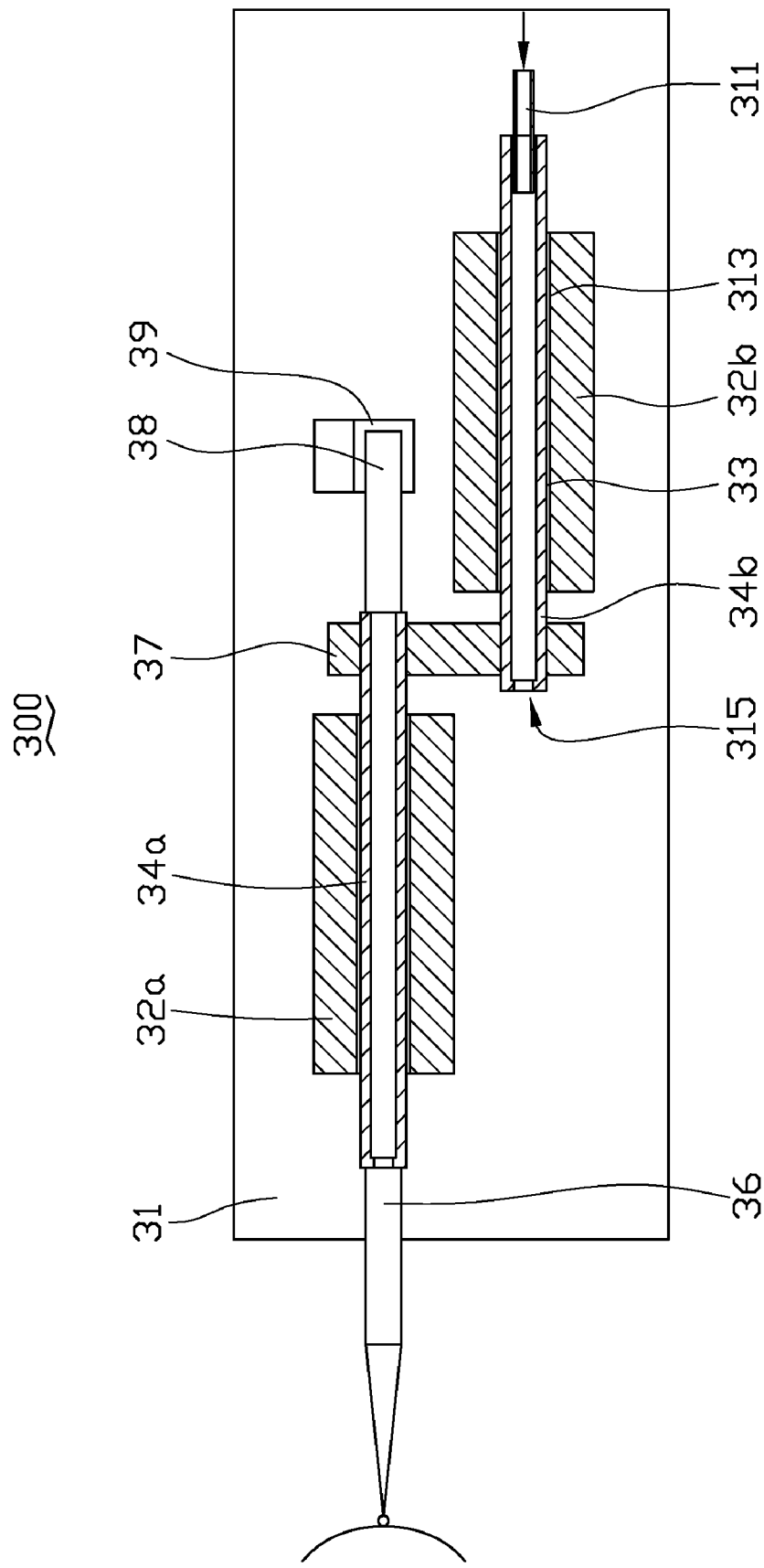
FIG. 11 is a top plan, cross-sectional view of a distance measuring probe in accordance with a third embodiment of the present invention.

Referring to FIG. 11, a distance measuring probe 300 of a third embodiment of the present invention includes a base 31, two tube tracks 32a, 32b, two hollow tubes 34a, 34b, a tip extension 36, a tube frame 37, a linear measuring scale 38, a displacement sensor 39, and a pipe 311.

The tube tracks 32a, 32b are mounted securely on the base 31. The tube tracks 32a, 32b are spaced apart from and parallel to each other. Each tube tracks 32a, 32b defines a tube rail channel 33 for receiving the corresponding hollow tube 34a, 34b. An air bearing is formed between the hollow tube 34a and the tube track 32a, and an air bearing 313 is formed between the hollow tube 34b and the tube track 32b. The distance measuring probe 300 is similar in principle to the distance measuring probe 200, except that no air is pumped into the hollow tube 34a, and the tip extension 36 is fixed directly to the hollow tube 34a. Because the tube tracks 32a, 32b are offset from each other, for reasons similar to those described above in relation to the distance measuring probe 200, the tip extension 36 of the distance measuring probe 300 can move very steadily forward and backward with little or no lateral displacement. Further, the distance measuring probe 300 is simpler than the distance measuring probe 200 and the distance measuring probe 100, because only the one hollow tube 34b is filled with air.

Because the distance measuring probes 100, 200, 300 each has two spaced and parallel hollow tubes 14, 24a, 24b, 34a, 34b, the tip extensions 16, 26, 36 effectively cannot move in directions other than a direction parallel to axes of the hollow tubes 14, 24a, 24b, 34a, 34b. In typical use of the distance measuring probes 100, 200, 300, the hollow tubes 14, 24a, 24b, 34a, 34b, are oriented horizontally. However, the measuring forces of the distance measuring probes 100, 200, 300 are minimally or not influenced by gravity.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A distance measuring probe, comprising:
   at least one tube track;
   a tip extension for touching a surface of an object, the tip extension being linearly movable relative to the at least one tube track;
   at least one hollow tube partly received in the at least one tube track and linearly slidable in the at least one tube track, the at least one hollow tube defining a cavity for containing a flux of air, and being configured to be driven by the flux of air to push the tip extension to move;
   an air discharge system configured to eject at least part of the flux of air in the at least one hollow tube out of the at least one hollow tube;
   a linear measuring scale configured to display values of displacements of the tip extension, the linear measuring scale being fixed relative to one of the at least one tube track and the tip extension; and
   a displacement sensor configured to detect and read the displacement values of the tip extension displayed by the linear measuring scale, the displacement sensor being fixed relative to the other one of the at least one tube track and the tip extension.

2. The distance measuring probe as claimed in claim 1, wherein the at least one tube track defines at least one tube rail channel, the at least one hollow tube is received in the corresponding tube rail channel, two ends of the at least one hollow tube protrude out from two ends of the corresponding tube rail channel respectively, and a gap is defined between the at least one hollow tube and the at least one tube track so that an air bearing is formed between the at least one hollow tube and the at least one tube track when air is pumped into the gap.

3. The distance measuring probe as claimed in claim 1, further comprising at least one pipe, air is pumped in the cavity of the at least one hollow tube via the at least one pipe, the at least one hollow tube comprises an open end and an opposite cylinder base, the at least one pipe is partially received in the cavity of the at least one hollow tube at the open end, the at least one hollow tube is slidable relative to the at least one hollow tube, a gap is defined between the at least one hollow tube and the at least one pipe so that an air bearing is formed between the at least one hollow tube and the at least one pipe when air is pumped into the cavity of the at least one hollow tube via the at least one pipe.

4. The distance measuring probe as claimed in claim 3, wherein the air discharge system comprises at least one opening communicating the cavity of the at least one hollow tube with an outside of the at least one hollow tube.

5. The distance measuring probe as claimed in claim 4, further comprising a base and a pipe holder, the at least one tube track and the pipe holder are mounted securely on the base, and the pipe holder holes the at least one pipe in position.

6. The distance measuring probe as claimed in claim 5, further comprising a cover engaging on the at least one tube track, the at least one hollow tube, the linear measuring scale, the displacement sensor, and the at least one pipe so as to prevent dust from entering the cover, the cover defines an opening for allowing a part of the tip extension to extend out therefrom.

7. The distance measuring probe as claimed in claim 5, wherein the at least one tube track is one tube track, the at least one hollow tube is two or more hollow tubes, and the at least one pipe is two pipes, the tube track defines two or more tube rail channels therein, the tube rail channels are spaced apart from and aligned parallel to one another, each pipe is partially received in the cavity of each hollow tube.

8. The distance measuring probe as claimed in claim 7, further comprising a first tube frame and a second tube frame, the cylinder base of the hollow tubes and the tip extension are fixed to the first tube frame, the open ends of the hollow tubes and one of the linear measuring scale and the displacement sensor are fixed to the second tube frame.

9. The distance measuring probe as claimed in claim 5, wherein the at least one tube track comprises a first tube track and a second tube track, wherein the at least one hollow tube is two hollow tubes, each tube track defines a tube rail channel for receiving one of the hollow tubes, the first and second tube tracks are offset from each other.

10. The distance measuring probe as claimed in claim 9, further comprising a first tube frame, a second tube frame, the at least one pipe is two pipes, the open end of one of the hollow tubes, the cylinder base of another one of the hollow tubes, one of the linear measuring scale and the displacement sensor are fixed to the second tube frame, the cylinder base of the first hollow tube and the tip extension are fixed to the first tube frame, each hollow tube receives a respective one of the pipe.

11. The distance measuring probe as claimed in claim 9, further comprising a tube frame, wherein the at least one pipe is a single pipe, the open end of one of the hollow tubes, the cylinder base of another one of the hollow tubes, and one of the linear measuring scale and the displacement sensor are fixed to the tube frame, the second hollow tube receives the pipe.

12. The distance measuring probe as claimed in claim 4, wherein the air discharge system comprises an air eject hole defined in the cylinder base of the at least one hollow tube, the air eject hole comprises a front cylindrical portion and a frustum portion, the front cylindrical portion has a diameter equaling to a smallest diameter of the frustum portion, the frustum portion intercommunicates the front cylindrical portion and the cavity of the at least one hollow tube, the frustum portion has a diameter gradually decreasing from the cavity to the front cylindrical portion, whereby air can flow smoothly out of the at least one hollow tube through the air eject hole of the air discharge system.

13. The distance measuring probe as claimed in claim 4, wherein the air discharge system comprises a plurality of air eject holes defined in the cylinder base of the at least one hollow tube, a central air eject hole is defined in a center and other air eject holes surround the central air eject hole, each air eject hole comprises a front cylindrical portion and a frustum portion, the front cylindrical portion has a diameter equaling to a smallest diameter of the frustum portion, the frustum portion intercommunicates the front cylindrical portion and the cavity of the at least one hollow tube, the frustum portion has a diameter gradually decreasing from the cavity to the front cylindrical portion, whereby air can flow smoothly out of the at least one hollow tube through the air eject hole of the air discharge system.

14. The distance measuring probe as claimed in claim 4, wherein the air discharge system comprises a plurality of air eject holes defined in the at least one hollow tube, each air eject hole comprises a front cylindrical portion and a frustum portion, the front cylindrical portion has a diameter equaling to a smallest diameter of the frustum portion, the frustum portion intercommunicates the front cylindrical portion and the cavity of the at least one hollow tube, the frustum portion has a diameter gradually decreasing from the cavity to the front cylindrical portion, whereby air can flow smoothly out of the at least one hollow tube through the air eject hole of the air discharge system.

15. The distance measuring probe as claimed in claim 4, wherein the air discharge system comprises a plurality of air eject holes defined in a sidewall of the at least one hollow tube.

16. The distance measuring probe as claimed in claim 4, wherein the air discharge system is a combination consisting of any of at least one air eject hole defined in the cylinder base of the at least one hollow tube, at least one air eject hole defined in a sidewall of at least one hollow tube, and the gap defined between at least one hollow tube and the pipe.

17. An actuator for driving a tip extension of a distance measuring probe, comprising:
at least one hollow tube defining a cavity for containing a flux of air, and being configured to be driven by the flux of air to drive the tip extension to move; and
at least one air discharge system configured to allow at least part of the flux of air in the cavity of the at least one hollow tube be ejected out of the at least one hollow tube.

18. The actuator as claimed in claim 17, wherein the air discharge system comprises at least one opening communicating the cavity of the at least one hollow tube with an outside of the at least one hollow tube.

19. The actuator as claimed in claim 18, further comprising at least one pipe, wherein the at least one pipe is partly received in the cavity of the at least one hollow tube and slidable in the at least one hollow tube, and air is pumped into the cavity of the at least one hollow tube via the at least one pipe.

* * * * *